United States Patent [19]

Carpenter et al.

[11] Patent Number: 5,197,280
[45] Date of Patent: Mar. 30, 1993

[54] CONTROL SYSTEM AND METHOD FOR CONTROLLING A GAS TURBINE ENGINE

[75] Inventors: R. Sheldon Carpenter, Lynn; William L. Gazzola, Salem, both of Mass.

[73] Assignee: General Electric Company, Cincinnati, Ohio

[21] Appl. No.: 607,786

[22] Filed: Oct. 29, 1990

Related U.S. Application Data

[63] Continuation of Ser. No. 325,723, Mar. 20, 1989, abandoned.

[51] Int. Cl.[5] .............................................. F02K 1/15
[52] U.S. Cl. ................................. 60/204; 60/238; 60/242
[58] Field of Search ............... 60/204, 233, 238, 242, 60/39.24

[56] References Cited

U.S. PATENT DOCUMENTS

| | | | |
|---|---|---|---|
| 2,706,383 | 4/1955 | Jacobson | 60/238 |
| 2,790,303 | 4/1957 | Kutzler | 60/238 |
| 2,971,326 | 2/1961 | Peters et al. | 60/242 |
| 3,016,696 | 1/1962 | Bryant | 60/242 |
| 3,139,922 | 7/1964 | Peczkowski | 60/39.281 |
| 3,747,344 | 7/1973 | Porter et al. | 60/242 |
| 4,139,887 | 2/1979 | Levesque | 60/242 |
| 4,242,864 | 1/1981 | Cornett et al. | 60/226 R |
| 4,294,068 | 10/1981 | Klees | 60/204 |
| 4,294,069 | 10/1981 | Camp | 60/238 |
| 4,397,148 | 8/1983 | Stockton et al. | 60/223 |
| 4,414,807 | 11/1983 | Kerr | 60/204 |
| 4,581,889 | 4/1986 | Carpenter et al. | 60/204 |

FOREIGN PATENT DOCUMENTS

| | | |
|---|---|---|
| 1205323 | 9/1970 | United Kingdom . |
| 1412301 | 11/1975 | United Kingdom . |
| 2019618 | 10/1979 | United Kingdom . |
| 1582938 | 1/1981 | United Kingdom . |

*Primary Examiner*—Louis J. Casaregola
*Attorney, Agent, or Firm*—Jerome C. Squillaro; Bernard E. Shay

[57] ABSTRACT

A control system for a gas turbine engine receives a signal representative of a first target engine operating condition and also receives a signal representative of an actual engine condition. The system produces an error signal representative of the difference between the target signal and the actual engine condition signal. A gain means adjusts the gain of the error signal to be equal to the desired change in the controlled engine parameter. The output of the gain means is then coupled to an activator of the engine which controls the parameter.

11 Claims, 5 Drawing Sheets

CONTROL SYSTEM AND METHOD FOR CONTROLLING A GAS TURBINE ENGINE

This is a continuation of application Ser. No. 07/325,723, filed Mar. 20, 1989 (abandoned).

This invention relates to a control system for a gas turbine engine and, more particularly, to a control system for controlling thrust in a gas turbine engine with a variable exhaust nozzle.

BACKGROUND OF THE INVENTION

In gas turbine engines it is typically desirable to control the engine's thrust output. Changes in the engine's thrust output may occur for various reasons such as sudden transient decreases in thrust output corresponding to temporary decreases in turbine efficiency. For example, these decreases in efficiency may occur following periods of sudden acceleration in which differences in thermal expansion of the engine's components result in a brief period of excessive tip clearance between the engine's turbine and shroud. An engine's thrust output will also gradually decrease with time corresponding to gradual deterioration of components in the engine. Typically, an engine manufacturer will provide an adequate thrust margin which allows for these decreases in thrust and still insures that the engine will meet certain minimum thrust levels throughout the engine's life until overhaul. When an engine is operating at maximum thrust, the thrust margin is typically obtained by isothermally holding the engine's turbine temperature at a maximum level so as to provide necessary thrust while protecting engine components from excessive temperatures. By holding the turbine temperature isothermally a new engine is operated at a much higher temperature than necessary to provide the required thrust. However, when turbine temperature is held isothermally, thrust and fan operating line are not maintained constant as deterioration occurs. Therefore as the engine deteriorates eventually the actual isothermally held temperature will be required to obtain the minimum desired maximum thrust levels. Thus, throughout much of an engine's operating life the engine must be operated at temperatures in excess of that which is required to maintain desired thrust levels. Requiring operation at these increased temperatures results in more rapid deterioration of the engine, therefore requiring a greater frequency of overhauls and a greater expense of operation. An alternative to holding turbine temperature isothermally provides for the monitoring of engine pressure ratio. While these pressure ratio control systems do not require the engine temperature to be operated in excess of that which is required to maintain desired thrust, these systems do require the use of pressure sensors to be added to the engines. These sensors provide increased expense to the engine, in addition, these sensors and associated control result in additional maintainability and reliability concerns corresponding to adding additional components to the engine.

SUMMARY OF THE INVENTION

A control system for a gas turbine engine comprises a means for receiving a signal representative of a first target engine operating condition and a means for receiving a signal representative of an actual engine condition. The system also has a difference means for producing an error signal representative of the difference between the target signal and the actual engine condition signal and a gain means for adjusting the gain of the error signal to be equal to the desired change in the controlled engine parameter. The output of the gain means is coupled to an activator of the engine which controls the parameter.

The invention also includes a control system for a gas turbine engine comprising a means for receiving a signal representative of a target engine condition and a means for receiving a signal representative of actual engine condition. A difference means produces an error signal representative of the difference between the target engine condition and the actual engine condition signal. A gain means adjusts the gain of the error signal to be equal to a desired change in an adjustable engine component. The system also comprises a means for receiving a signal representative of a target position for the adjustable engine component and a means for combining the output of the gain means to the means for receiving a signal representative of a target position for the adjustable engine component and the combined gain means and the adjustable engine component target position means is coupled to an activator of the engine which controls the adjustable engine component.

The invention also includes a method of controlling a gas turbine engine comprising the steps of receiving a signal representative of a target engine condition and receiving a signal representative of actual engine condition. An error signal is produced which is representative of the difference between the target engine condition and the actual engine condition signal. The gain of the error signal is adjusted to be equal to a desired change in an adjustable engine component. The steps further comprise receiving a signal which is representative of a target position for the adjustable engine component and combining the output of the gain means to the means for receiving a signal representative of a target position for the adjustable engine component and then coupling the output of the combined gain means and the adjustable engine component target position means to an activator of the engine which controls the adjustable engine component.

DETAILED DESCRIPTION OF PREFERRED EMBODIMENTS

Figure 1:
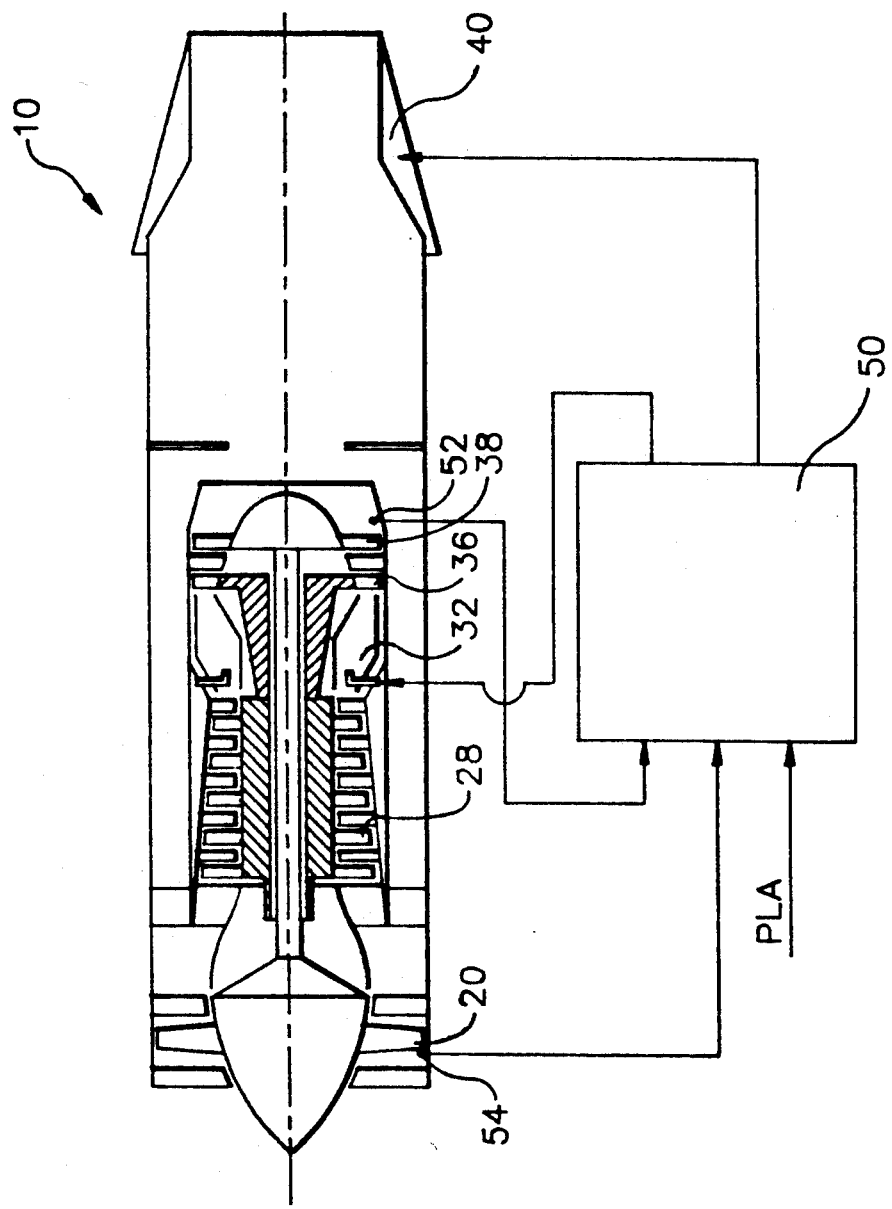
FIG. 1 is a schematic cross section of an exemplary gas turbine engine to which the control means of the present invention relates.

Referring initially to FIG. 1, one form of a gas turbine engine to which the present invention relates is generally designated as 10. The gas turbine engine comprises a first compressor 20 which produces a downstream flow, a second compressor 28 is positioned downstream of the first compressor 20, a combustor region 32 is positioned downstream of the second compressor 28, first and second turbines 36 and 38 respectively, are positioned downstream of the combustor region 32, and a variable exhaust nozzle 40 is positioned downstream of the first and second turbines 36 and 38 respectively. A control system 50 receives inputs such as from a temperature sensor 52, a fan speed sensor 54, and a power level angle (PLA) and the control system 50 has outputs which control the position of the variable exhaust nozzle 40 and the amount of fuel flow into the combustor region 32.

Figure 2:
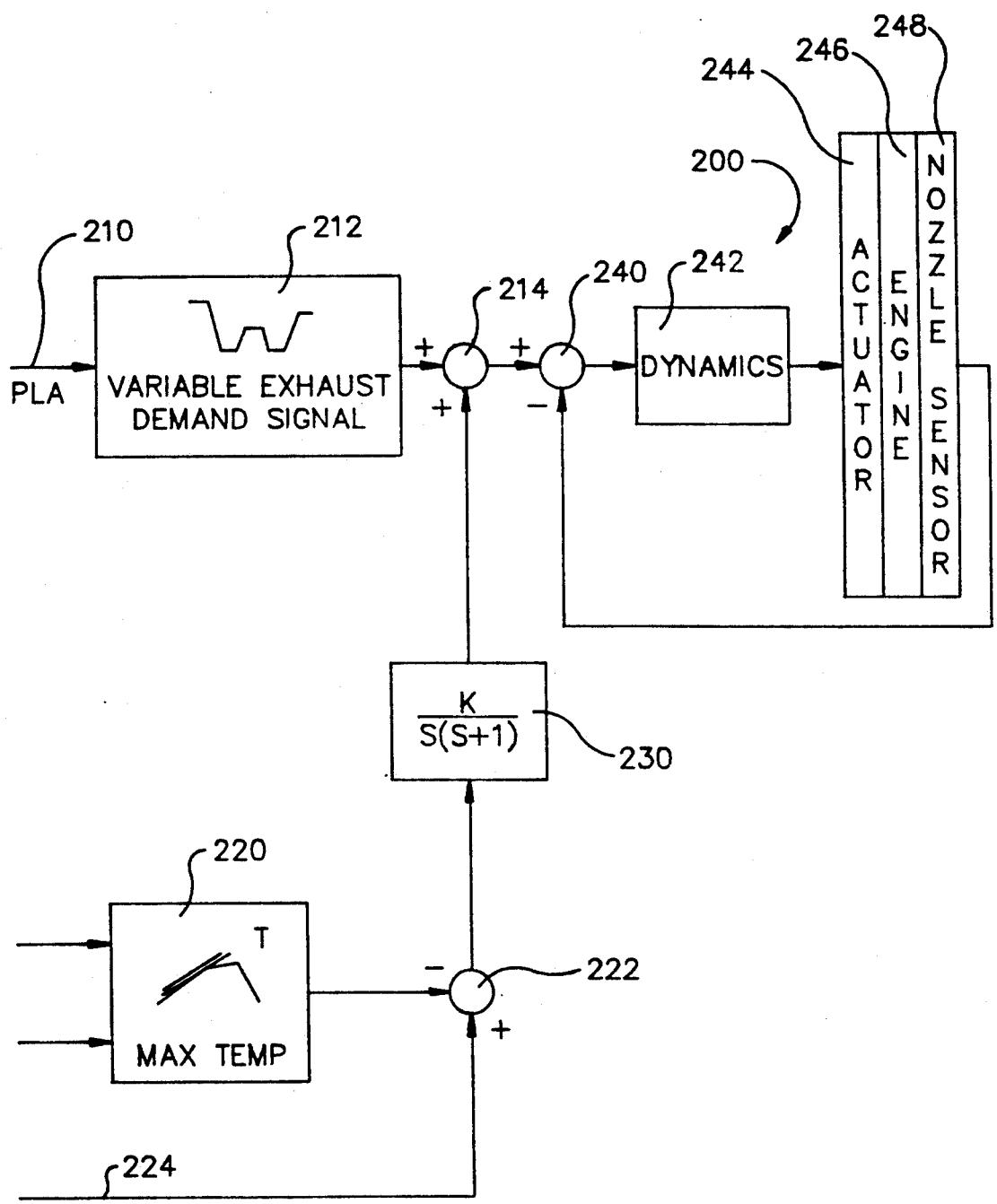
FIG. 2 is a schematic block diagram of a control system.

In FIG. 2, a control system 200 without the advantages of the present invention is depicted which may control in part the position of the variable exhaust nozzle 40. The control system 200 has a means for receiving a PLA demand signal 210 and a means for generating a variable exhaust nozzle demand signal 212 based on the value of the signal received by the receiving means 210. The variable exhaust demand signal means 212 is coupled to a means for combining signals 214. The control system also has a means for receiving a maximum allowable engine operating temperature 220 which is coupled to an input of a first difference means 222. A means for receiving the actual engine operating temperature 224 is also coupled to an input of the first difference means 222. The first difference means 222 has a means for producing a temperature error signal which represents a difference of the signal received from the actual temperature receiving means 224 minus the signal received from the means for receiving the maximum temperature 220. The output of the first difference means 222 is coupled to an integrator 230 and the output of the integrator 230 is coupled to an input of the means for combining signals 214. The means for combining signals 214 has an output which is coupled to a second difference means 240 whose output is coupled to a set of dynamics 242 and the output of the dynamics 242 is coupled to an actuator which moves the variable exhaust nozzle of the engine 246 and an engine sensor 248, which senses the position of the variable exhaust nozzle, is coupled to an input of the second difference means 240.

In operation, the control system 200 receives a PLA demand signal by the means for receiving the PLA signal 210 and the system then generates a variable exhaust demand signal based on the PLA signal. Typically, at maximum levels of thrust, without an afterburner, the variable exhaust nozzle will indicate that the nozzle should be at its narrowest position. The variable exhaust demand signal is adjusted so that the engine does not exceed a maximum allowable temperature. This adjustment is obtained by a signal representative of the actual engine temperature being received from the means for receiving the actual temperature 224 and a signal representative of the maximum allowable engine operating temperature is obtained by the means for receiving maximum engine temperature 220. These signals are coupled to the difference means 222 which produces a temperature error signal which is coupled to the integrator 230 which provides the signal adjustment. The integrator 230 in the system will attempt to drive the temperature error to zero and therefore the variable exhaust demand signal will be adjusted by the combining means 214 such that the engine operates at the maximum allowable temperature. The adjusted variable exhaust demand signal is coupled to the set of dynamics which conditions the signal for control of the exhaust nozzle by the actuator 244. The actuator moves the nozzle position of the engine 246 and the sensor 248 provides feedback information as to the position of the exhaust nozzle. Therefore, control system 200 controls the engine such that at maximum thrust, without afterburner, the engine temperature is controlled to be equal to a maximum allowable value. Operating at the maximum allowable temperature will result in new engines which have not suffered deterioration being operated at temperatures much higher than necessary to achieved required levels of thrust. When engines are operated at these increased temperatures this results in more rapid deterioration of the engine, therefore requiring a greater frequency of overhauls and a greater expense of operation.

Figure 3:
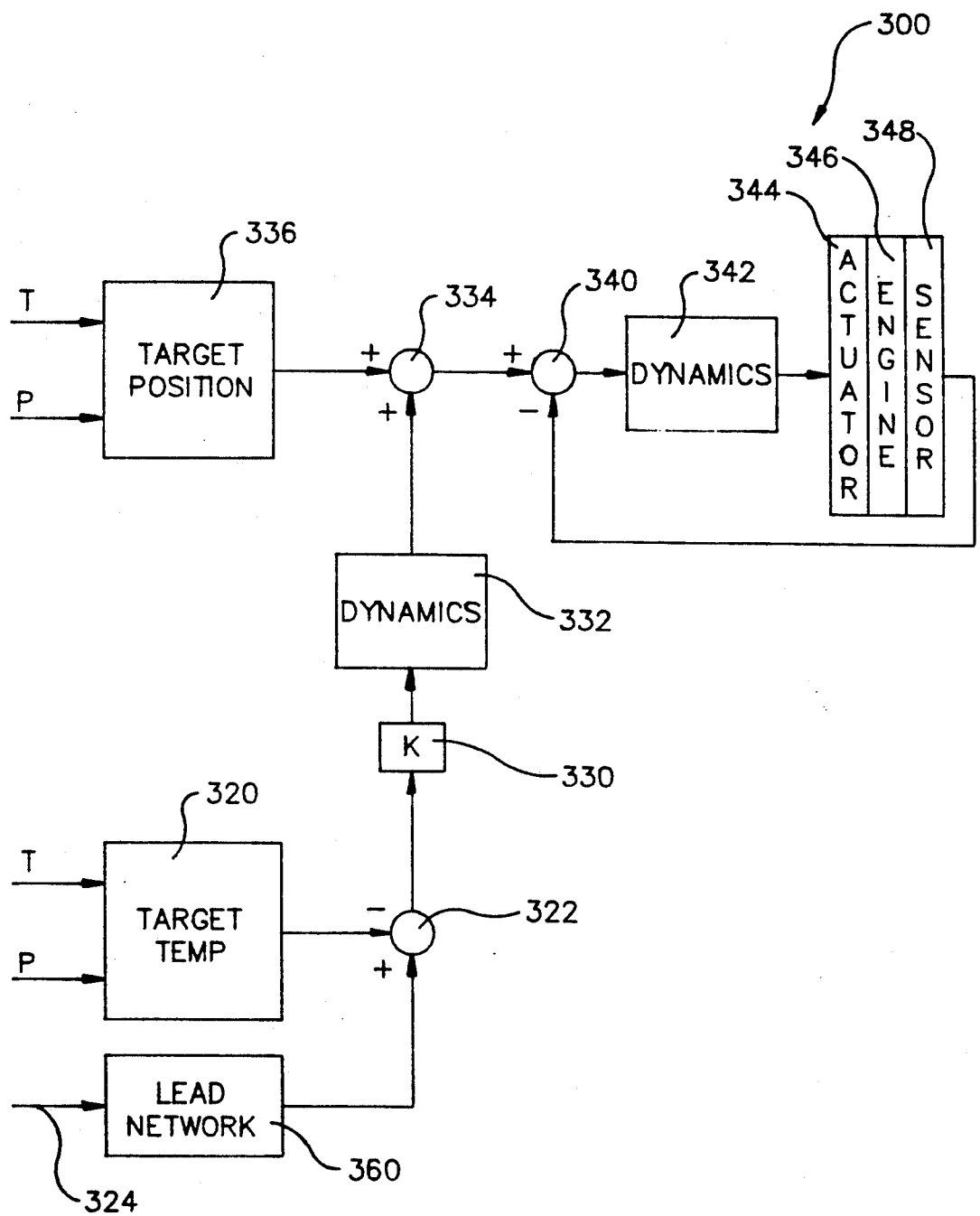
FIGS. 3 and 5 are schematic block diagrams of different embodiments of control systems of the present invention.

In FIG. 3 one embodiment of the present invention in which one portion of a control system 300 controls in part the position of the variable exhaust nozzle. The control system 300 comprises a means for receiving a target engine operating temperature 320 which is coupled to an input of a first difference means 322. A means for receiving the actual engine operating temperature 324 is also coupled to an input of the first difference means 322. The first difference means 322 has a means for producing a temperature error signal which represents a difference of the signal received from the actual temperature receiving means 324 minus the signal received from the means for receiving the target temperature 320. The output of the first difference means 322 is coupled to a gain means 330 and the output of the gain means 330 is coupled to a first set of dynamics 332. The output of the first dynamics 330 is coupled to a first means for combining signals 334. A means for receiving a target variable exhaust nozzle position 336 is also coupled to an input of the second means for combining signals 334. The output of the first means for combining signals 334 is coupled to an input of a second difference means 340 whose output is coupled to a second set of dynamics 342 and the output of the Second dynamics 342 is coupled to an actuator 344 which moves the variable exhaust nozzle of an engine 346 and an engine sensor 348, such as a linear differential transformer which senses the position of the nozzle, is coupled to an input of the second difference means 340.

The control system is typically implemented through a digital electronic control (DEC) or a full authority digital electronic control (FADEC). The means for receiving a target engine operating temperature 320 typically receives numerous inputs such as fan inlet temperature and ambient pressure. The inputs are typically compared to a schedule for a new undeteriorated engine and based on the schedule a target engine operating temperature is obtained. The schedule is typically obtained by using an engine performance model to examine performance under varying conditions. Alternatively, an adjustable control may be used to analyze actual engine performance.

The means for receiving a target variable exhaust nozzle position 336 also typically receives numerous inputs such as fan inlet temperature and ambient pressure. The inputs are typically compared to a schedule for a new undeteriorated engine and based on the schedule a target engine exhaust nozzle position is obtained. Thus, like the temperature schedule, the variable exhaust nozzle position schedule is also typically obtained by using a cycle model or analyzing actual engine performance.

The means for receiving actual engine operating temperature is also preferably an input port of the electronic control which receives outputs from engine temperature sensors. Typically, the discharge temperature of the second turbine 38 as in FIG. 1 or a low pressure turbine temperature is detected. As shown in FIG. 3, the means for receiving actual engine operating temperature 324 may be coupled to a temperature lead compensation network 360 which compensates for delays in temperature detection and the output of the lead compensation network is coupled to the first difference means 322.

Figure 4:
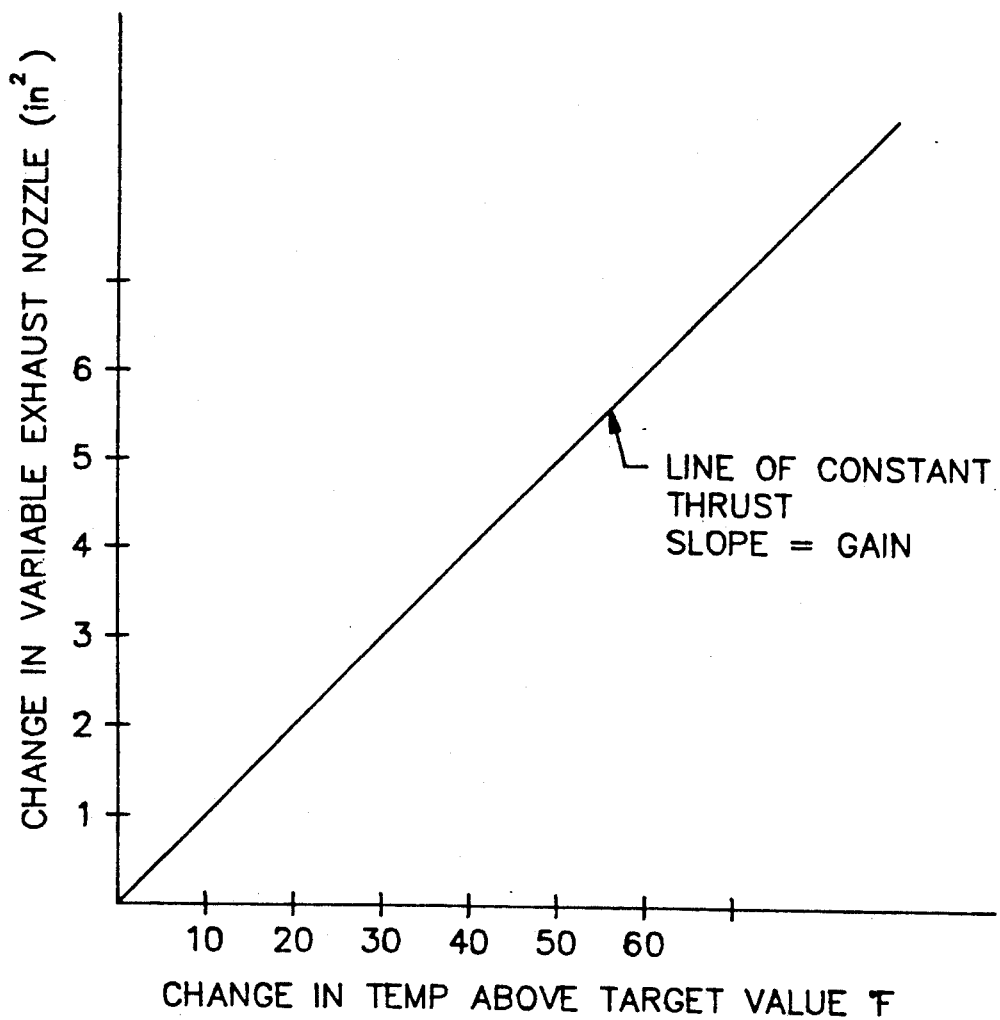
FIG. 4 is a graph of change in temperature versus exhaust nozzle area.

The gain means 330 is typically chosen to provide constant thrust. The gain is based on engine data or cycle predictions which are utilized to determine how much the variable exhaust nozzle position must open versus an increase in the engine temperature to hold thrust constant. As shown in FIG. 4 an engine may be tested to identify a line of constant thrust from which the slope may be taken to obtain the appropriate gain. For example, for a change in temperature above target temperature in degrees fahrenheit versus a change in variable nozzle position in square inches the line of constant thrust may have a slope of about 0.097 in$^2$/° F. and therefore the gain would be 0.097. However, it should be understood that the gain may also be a complex function or a schedule requiring various inputs relating to engine conditions to achieve the correct gain at a given set of conditions.

In operation, the control system 300 receives a signal representative of the actual engine temperature from the means for receiving the actual temperature 324 and this signal is processed through the lead compensation network 360 to compensate for delays in temperature detection. A signal representative of the target engine operating temperature for a base engine is obtained by the means for receiving target engine temperature 320. The first difference means 322 produces a temperature error signal representative of the difference between the actual engine temperature and that of the target temperature. This temperature error signal is coupled to the gain means 330 which adjusts the value of the error signal to provide a signal representative of a proportionate change in the variable exhaust nozzle. The output of the gain means 330 is coupled to the first set of dynamics 332 which provides compensation to insure stability which is accomplished by standard techniques while maintaining the appropriate gain. The means for receiving a target variable exhaust nozzle position 336 provides a signal representative of a target nozzle position representative of a base or standard engine, such as a new engine. This variable exhaust target signal is then coupled to the output of the first set of dynamics through the first means for combining signals 334. The output of the first means for combining signals 334 provides an exhaust nozzle control signal based on the target position which is adjusted by the difference between the actual and the target temperature. The output of the combining means 334 is coupled to the second set of dynamics 342 which conditions the signal for control of the exhaust nozzle by an actuator 344 which adjusts the position of the engine component 346 and the engine sensor 348 provides feedback information relating to the position of the exhaust nozzle which is then subtracted from the desired signal by the second difference means 340.

Therefore, the system of FIG. 3 has numerous advantages of the system of FIG. 2. The system of FIG. 3 is not continuously operated at the maximum allowable temperature. Instead, the engine is controlled to maintain constant thrust. This therefore results in the engine being operated at substantially reduced temperatures through much of its operating life and as the engine gradually deteriorates the engine operating temperature will increase and the variable exhaust nozzle will change from its nominal position to provide a constant thrust output. Typically the engine of the present invention would be overhauled when the operating temperature reaches the maximum operating temperature, that being the temperature at which the engine of FIG. 2 normally operates. By operating the engine at reduced temperatures this results in greater periods of time between overhauls and therefore reduces the expense of operation. Further, unlike the system of FIG. 2, by operating at constant thrust the system of FIG. 3 can compensate for sudden transient decreases in engine efficiency. These advantages are achieved without additional sensors or associated control, but rather incorporate the sensors and systems typically utilized in a gas turbine engine.

Figure 5:
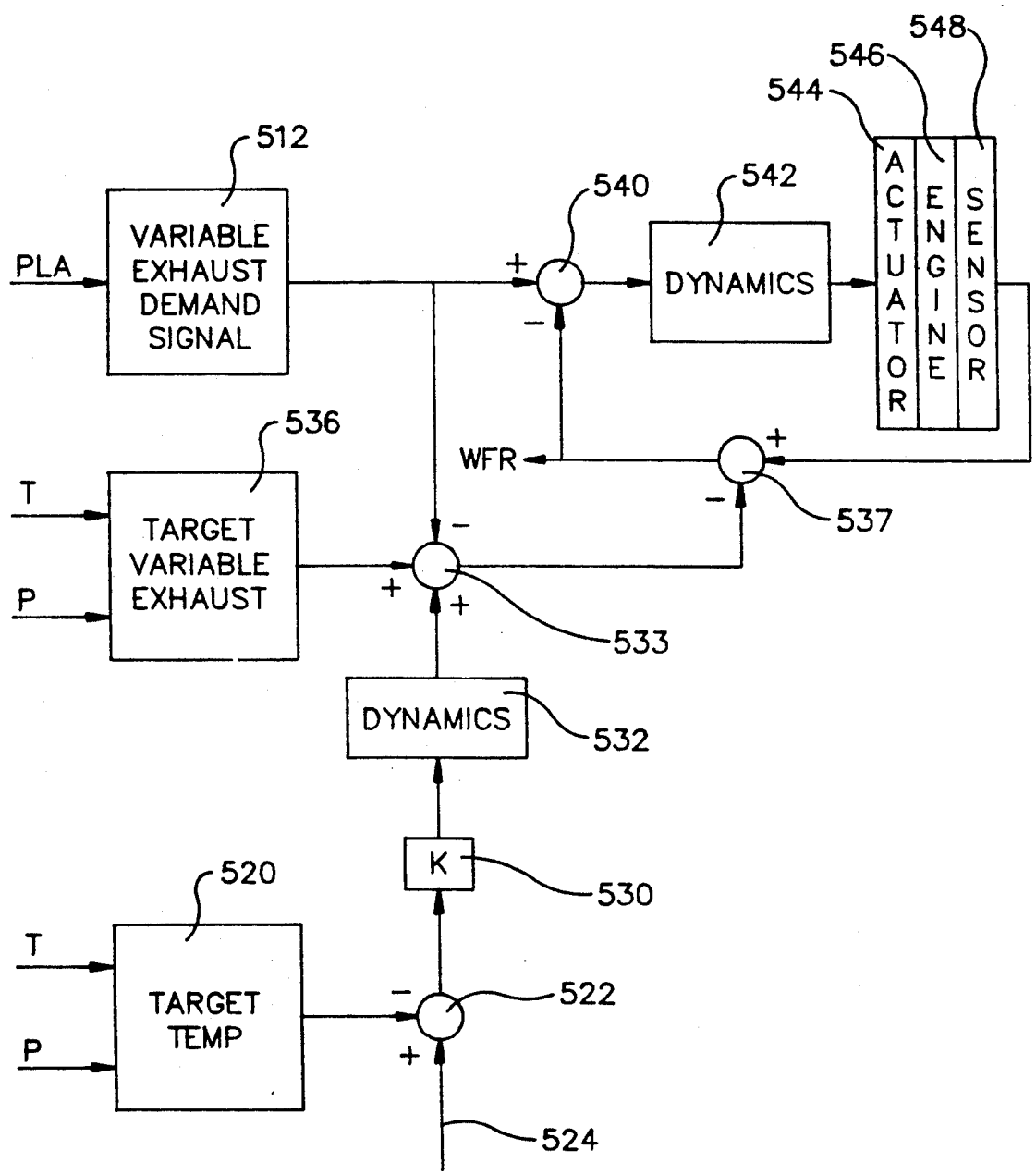

In FIG. 5 another embodiment of the present invention in which one portion of a control system 500 controls in part the position of the variable exhaust nozzle 40. The control system 500 comprises a means for receiving a PLA demand signal 510 and a means for generating a variable exhaust nozzle demand signal 512 based on the PLA signal 510. The control system 500 also has a means for receiving a target engine operating temperature 520 which is coupled to an input of a difference means 522. A means for receiving the actual engine operating temperature 524 is coupled to an input of the difference means 522. The output of the first difference means 522 is coupled to a gain means 530 and the output of the gain means 530 is coupled to a first set of dynamics 532. The output of the first dynamics 532 is coupled to a combining and difference means 533. A means for receiving a target variable exhaust nozzle position 536 and the output of the variable exhaust signal means 512 are also coupled to inputs of the combining and difference means 533 which adds the output of the first dynamics 532 and target nozzle position 536 and subtracts the variable exhaust signal means 512. The output of the combining and difference means 533 is coupled to an input of an augmented fuel difference means 537. An output of the fuel difference means 537 is coupled to an augmented fuel control of the engine (WFR) and both the output of the fuel difference means 537 and an output of the variable exhaust signal means 512 are coupled to a second difference means 540 whose output is coupled to a second set of dynamics 542 and the output of the second dynamics 542 is coupled to an actuator 544 which moves the variable exhaust nozzle of the engine 546 and an engine sensor 548, such as a linear differential transformer which senses the position of the nozzle, is coupled to an input of the fuel difference means 537 which subtracts the output of the combining and difference means 533 from the output of the engine sensor 548.

The control system of FIG. 5 is typically implemented similarly to the previous embodiment of FIG. 3 and in operation, the control system 500 receives a PLA demand signal by the means for receiving the PLA signal 510 and the system then generates a variable exhaust demand signal based on the PLA signal. Typically, at maximum levels of thrust, without an afterburner, the variable exhaust nozzle will indicate that the nozzle should be at its narrowest position. This signal is then adjusted to compensate for the engine temperature as a signal representative of the actual engine temperature is received from the means for receiving the actual temperature 524 and a signal representative of the target engine operating temperature is obtained by the means for receiving target engine temperature 520. These signals are coupled to the first difference means 522, the gain means provides the appropriate adjustment of the signal for the proportionate change in variable exhaust nozzle position, the first dynamics provides and necessary compensation to insure stability and the combining and difference means 533 combines the output of the means for receiving a target variable exhaust position 536, the first dynamics 532 and the variable exhaust signal means 512. The output of the combining and difference means 533 is subtracted from the output of the engine sensor 548 which then provides a signal for the augmented fuel control. This augmented fuel signal is also subtracted from the output of the variable exhaust signal means 512, resulting in the exhaust nozzle control signal which is processed through the second set of dynamics for control of the exhaust nozzle through the actuator 544.

Thus, the control system of FIG. 5 also controls the exhaust nozzle position to maintain constant thrust based on deviations from target positions of characteristics such as of new undeteriorated engines. It should be noted that while the position of the PLA provides an input to the augmented fuel control, at maximum thrust the exhaust nozzle position is not dependent on the PLA. As in FIG. 3, typically the control system will sense the position of the PLA and will activate the control system of FIG. 5 when the PLA is set for maximum thrust.

While certain preferred features of the invention have been illustrated, it should be understood that the invention is equally applicable to other embodiments. For example, the control system may control other engine components such as a variable core, in which case the schedules and gain means would change appropriately such as including a target core position. The means components of the invention may also be implemented by either separate components or through as components of a single program. It is therefore understood that the attached claims are intended to cover these and other such modifications and changes that fall within the true spirit of the invention.

We claim:

1. A control system for a gas turbine engine having a variable exhaust nozzle comprising:
   means for receiving a signal representative of a target engine temperature;
   means for receiving a signal representative of actual engine temperature;
   difference means for producing an error signal representative of the difference between said target temperature signal and said actual engine temperature signal;
   gain means for adjusting the gain of said error signal to be equal to the desired change in the position of a variable exhaust nozzle;
   means for receiving a signal representative of a target position for said variable exhaust nozzle; and
   means for combining the output of said gain means to the output of said means for receiving a signal representative of a target position for said variable exhaust nozzle and said combined gain means and said variable exhaust nozzle target means are coupled to an activator of the engine which controls the variable exhaust nozzle.

2. The control system of claim 1 wherein said gas turbine engine includes a low pressure turbine and said means for receiving actual engine temperature is a means for receiving the temperature of said low pressure turbine.

3. A control system for a gas turbine engine comprising:
   means for receiving a signal representative of a target engine condition;
   means for receiving a signal representative of actual engine condition;
   difference means for producing an error signal representative of the difference between said target engine condition and said actual engine condition signal;
   gain means for adjusting the gain of said error signal to be equal to a desired change in an adjustable engine component;
   means for receiving a signal representative of a target position for said adjustable engine component;
   means for combining the output of said gain means to the output of said means for receiving a signal representative of a target position for said adjustable engine component and said combined gain means and said adjustable engine component target position means is coupled to an activator of the engine which controls the adjustable engine component.

4. The control system of claim 3 wherein said target engine condition is engine temperature and said actual engine condition is actual engine temperature.

5. The control system of claim 4 wherein said gas turbine engine includes a low pressure turbine and said means for receiving actual engine temperature is a means for receiving the temperature of said low pressure turbine.

6. The control system of claim 3 wherein said adjustable engine component is a variable exhaust nozzle.

7. A method of controlling a gas turbine engine comprising the steps of:
   receiving a signal representative of a target engine condition;
   receiving a signal representative of actual engine condition;
   producing an error signal representative of the difference between said target engine condition signal and said actual engine condition signal;
   adjusting the gain of said error signal to be equal to a desired change in an adjustable engine component;
   receiving a signal representative of a target position for said adjustable engine component;
   combining said adjusted error signal to said signal representative of a target position for said adjustable engine component to form a combined signal;
   coupling said combined signal to an activator of the engine which controls the adjustable engine component.

8. A control system for controlling a parameter of a gas turbine engine, said control system comprising:
   means for receiving a signal representative of a first target engine operating condition;
   means for receiving a signal representative of an actual engine condition;
   difference means for producing an error signal representative of the difference between said target signal and said actual engine condition signal;
   gain means for adjusting the gain of said error signal to be equal to the desired change in the controlled engine parameter;
   coupling the output of said gain means to an activator of the engine which control said parameter;
   means for receiving a signal representative of a target position for said controlled parameter; and means for combining the output of said gain means to the output of said means for receiving a signal representative of a target position for said controlled parameter.

9. The control system of claim 8 wherein said means for receiving a signal representative of actual engine condition is a means for receiving actual engine temperature.

10. The control system of claim 9 wherein said gas turbine engine includes a low pressure turbine and said means for receiving actual engine temperature is a means for receiving the temperature of the low pressure turbine.

11. The control system of claim 10 wherein said means for receiving a signal representative of a target position for said controlled parameter is a means for receiving a signal representative of a target position for a variable exhaust nozzle on said engine.

* * * * *